(12) United States Patent  (10) Patent No.: US 7,940,359 B2
Lee  (45) Date of Patent: May 10, 2011

(54) LIQUID CRYSTAL DISPLAY COMPRISING A DIELECTRIC LAYER HAVING A FIRST OPENING SURROUNDING A PATTERNED STRUCTURE AND EXPOSING A PORTION OF A FIRST PIXEL ELECTRODE AND A SECOND PIXEL ELECTRODE FORMED ON THE DIELECTRIC LAYER

(75) Inventor: Seok-Lyul Lee, Hsin-Chu (TW)

(73) Assignee: Au Optronics Corporation, Hsinchu (TW)

( * ) Notice: Subject to any disclaimer, the term of this patent is extended or adjusted under 35 U.S.C. 154(b) by 765 days.

(21) Appl. No.: 11/739,901

(22) Filed: Apr. 25, 2007

(65) Prior Publication Data

US 2008/0266480 A1 Oct. 30, 2008

(51) Int. Cl.
*G02F 1/1333* (2006.01)
*G02F 1/1337* (2006.01)
*G02F 1/1343* (2006.01)

(52) U.S. Cl. .......... 349/138; 139/129; 139/130; 139/39; 139/122

(58) Field of Classification Search ............... 349/39, 349/147, 129, 130, 138
See application file for complete search history.

(56) References Cited

U.S. PATENT DOCUMENTS

| 6,281,952 B1* | 8/2001 | Okamoto et al. | 349/12 |
| 6,839,116 B2* | 1/2005 | Hong et al. | 349/141 |
| 6,853,427 B2 | 2/2005 | Park et al. | |
| 6,900,869 B1 | 5/2005 | Lee et al. | |
| 6,954,248 B2 | 10/2005 | Song et al. | |
| 7,016,001 B2 | 3/2006 | Tanaka et al. | |
| 2007/0182901 A1* | 8/2007 | Wang et al. | 349/129 |

FOREIGN PATENT DOCUMENTS

| CN | 1711495 A | 12/2005 |
| CN | 1881049 A | 12/2006 |

* cited by examiner

*Primary Examiner* — Mark A Robinson
*Assistant Examiner* — Dennis Y Kim
(74) *Attorney, Agent, or Firm* — Tim Tingkang Xia; Morris, Manning & Martin, LLP

(57) ABSTRACT

A liquid crystal display (LCD) device. In one embodiment, the LCD device includes a first substrate and a second substrate positioned apart from the first substrate, a liquid crystal layer positioned between the first substrate and the second substrate, and a plurality of pixels formed on the first substrate. Each pixel has a first pixel electrode formed on the first substrate, a second pixel electrode formed on an dielectric layer, wherein the dielectric layer is formed on the first pixel electrode to have a patterned structure with an opening exposing a portion of the first pixel electrode such that the second pixel electrode is connected to the first pixel electrode through the one opening; and an auxiliary common electrode formed on the dielectric layer and distantly surrounding the second pixel electrode.

35 Claims, 9 Drawing Sheets

400

(a)

(b)

500

(a)

(b)

LIQUID CRYSTAL DISPLAY COMPRISING A DIELECTRIC LAYER HAVING A FIRST OPENING SURROUNDING A PATTERNED STRUCTURE AND EXPOSING A PORTION OF A FIRST PIXEL ELECTRODE AND A SECOND PIXEL ELECTRODE FORMED ON THE DIELECTRIC LAYER

FIELD OF THE INVENTION

The present invention relates generally to a liquid crystal display (LCD), and more particularly to an LCD device that utilizes a patterned structure to improve the viewing angle, light transmittance, contrast ratio and response time of display and a method of manufacturing the same.

BACKGROUND OF THE INVENTION

Liquid crystal display (LCD) is commonly used as a display device because of its capability of displaying images with good quality while using little power. An LCD apparatus includes an LCD panel formed with liquid crystal cells and pixel elements with each associating with a corresponding liquid crystal cell and having a liquid crystal capacitor and a storage capacitor, a thin film transistor (TFT) electrically coupled with the liquid crystal capacitor and the storage capacitor. These pixel elements are substantially arranged in the form of a matrix having a number of pixel rows and a number of pixel columns. Typically, scanning signals are sequentially applied to the number of pixel rows for sequentially turning on the pixel elements row-by-row. When a scanning signal is applied to a pixel row to turn on corresponding TFTs of the pixel elements of a pixel row, source signals (image signals) for the pixel row are simultaneously applied to the number of pixel columns so as to charge the corresponding liquid crystal capacitor and storage capacitor of the pixel row for aligning orientations of the corresponding liquid crystal cells associated with the pixel row to control light transmittance therethrough. By repeating the procedure for all pixel rows, all pixel elements are supplied with corresponding source signals of the image signal, thereby displaying the image signal thereon.

Liquid crystal molecules have a definite orientational alignment as a result of their long, thin shapes. The orientations of liquid crystal molecules in liquid crystal cells of an LCD panel play a crucial role in the transmittance of light therethrough. For example, in a twist nematic LCD, when the liquid crystal molecules are in its tilted orientation, light from the direction of incidence is subject to various different indexes of reflection. Since the functionality of LCDs is based on the birefringence effect, the transmittance of light will vary with different viewing angles. Due to such differences in light transmission, optimum viewing of an LCD is limited within a narrow viewing angle. The limited viewing angle of LCDs is one of the major disadvantages associated with the LCDs and is a major factor in restricting applications of the LCDs.

Several approaches exist for increasing the viewing angles of LCDs, such as in-plane switching (IPS), and multi-domain vertical alignments. The IPS mode uses comb-like inter-digitized electrodes to apply electrical fields in the plane of the substrates, thereby aligning the liquid crystal molecules along the substrates and providing wide viewing angles for use in wide viewing angle monitors or other applications. However, although IPS provides wide viewing angles, it requires high voltages and has low aperture ratios. In addition, due to the planar electric field structure, IPS mode inherently suffers from severe image sticking.

The vertical alignment mode uses a liquid crystal material with the negative dielectric anisotropy and vertical alignment films. When no voltage is applied to the mode, liquid crystal molecules are aligned in a vertical direction and no light passes through the liquid crystal molecules and therefore a black display appears. When a predetermined voltage is applied, the liquid crystal molecules are aligned in a horizontal direction and light passes through the liquid crystal molecules and a white display appears. The vertical alignment mode provides a high contrast ratio of display and a fast response speed. Furthermore, a multi-domain arrangement is achieved by introducing a protruding structure that forces the liquid crystal molecules to tilt in different directions, thereby providing an excellent viewing angle characteristic for white display and black display. As shown in FIG. 9, a conventionally vertical alignment mode 900 utilizes a layer 910 with a protrusion structure 912 formed on a color filter substrate 920 to divide liquid crystal domains. As a result, it requires an extra photolithography step during fabrication, and thus increases production cost. Additionally, the protrusion structure 912 may make the contrast ratio of display lower due to the light leakage in the black display.

Therefore, a heretofore unaddressed need exists in the art to address the aforementioned deficiencies and inadequacies.

SUMMARY OF THE INVENTION

The present invention, in one aspect, relates to an LCD device. In one embodiment, the LCD device has a first substrate and a second substrate positioned apart to define a cell gap therebetween, a liquid crystal layer positioned in the cell gap between the first substrate and the second substrate, and a plurality of scanning lines arranged in a first direction on the first substrate and a plurality of data lines arranged crossing the plurality of scanning lines in a second direction that is perpendicular to the first direction on the first substrate to define a plurality of pixels therewith. The LCD device also has a common electrode formed on the second substrate.

Each pixel includes a first dielectric layer formed on the first substrate, a first pixel electrode formed on the first dielectric layer, a second dielectric layer formed at least on the first pixel electrode with an opening exposing a portion of the first pixel electrode, a second pixel electrode formed on the second dielectric layer in an area in which the opening is located such that the second pixel electrode is connected to the first pixel electrode through the opening, and an auxiliary common electrode formed on the second dielectric layer and distantly surrounding the second pixel electrode.

In one embodiment, the first pixel electrode is formed of indium zinc oxide (IZO), amorphous indium tin oxide (ITO), poly ITO, or any combination of them. The first pixel electrode has a thickness in the range of about 0.04-3.0 μm. The second pixel electrode has a geometric shape of a circle, rectangle, or polygon. In one embodiment, the second pixel electrode and the auxiliary common electrode define a distance therebetween, which is greater than the cell gap. The second pixel electrode and the auxiliary common electrode are formed of transparent or opaque conductivity material.

In one embodiment, the second dielectric layer in each pixel has a patterned structure, where the patterned structure includes a geometric shape of a circle, rectangle, polygon, star, or cross. The second dielectric layer is formed of SiNx, and has a thickness in the range of about 0.1-10.0 μm.

In one embodiment, the liquid crystal layer comprises liquid crystals having a negative dielectric anisotropy. The liquid crystals are selected such that a product of the refractive index $\delta_n$ of the liquid crystals and the cell gap is in a range of about 0.15-0.60 um. The liquid crystals are aligned homeotropically to the first substrate and the second substrate in the absence of an electric field therein.

In operation, when a voltage is applied to one of the first pixel electrode and the common electrode, a corresponding voltage difference is established therebetween, and an oblique electric field is generated in the liquid crystal layer. The generated oblique electric field drives the liquid crystals of the liquid crystal layer in desired directions. The common electrode and the auxiliary common electrode have an identical, first electric potential, and the first pixel electrode and the second pixel electrode have an identical, second electric potential that is substantially different from the first electric potential.

In another aspect, the present invention relates to an LCD device. In one embodiment, the LCD device includes a first substrate and a second substrate positioned apart from the first substrate, a liquid crystal layer positioned between the first substrate and the second substrate, and a plurality of pixels formed on the first substrate. Each pixel has a first pixel electrode formed on the first substrate, a second pixel electrode formed on a dielectric layer, and an auxiliary common electrode formed on the dielectric layer and distantly surrounding the second pixel electrode. The dielectric layer is formed on the first pixel electrode to have a patterned structure with an opening exposing a portion of the first pixel electrode such that the second pixel electrode is connected to the first pixel electrode through the one opening. In one embodiment, the patterned structure has a geometric shape of a circle, rectangle, polygon, star, or cross. Furthermore, the LCD device includes a common electrode formed between the second substrate and the liquid crystal layer.

The liquid crystal layer comprises a plurality of liquid crystals that are aligned homeotropically to the first substrate and the second substrate in the absence of an electric field therein.

In operation, the common electrode and the auxiliary common electrode have an identical, first electric potential, and the first pixel electrode and the second pixel electrode have an identical, second electric potential that is substantially different from the first electric potential.

In yet another aspect, the present invention relates to a method of manufacturing an LCD device. In one embodiment, the method includes the steps of (a) providing a first substrate, (b) forming a plurality of gate electrodes on the first substrate, each pair of adjacent gate electrodes defining a pixel area therebetween, the pixel area being adjacent to a switching area in which a corresponding gate electrode is formed, (c) forming a dielectric layer on the first substrate and the plurality of gate electrodes, (d) forming a semiconductor layer on the dielectric layer in each switching area, (e) forming an contact layer on the semiconductor layer, the contact layer having a first portion and a second portion separated from the first portion, (f) forming a first pixel electrode on the dielectric layer in each pixel area, (g) forming a metal layer on the semiconductor layer and the contact layer in each switching area, the metal layer having a first portion connected to a data line and a second portion separated from the first portion and connected to the first pixel electrode layer in a corresponding pixel area, (h) forming a passivation layer on the metal layer in each switching area and the first pixel electrode in each pixel area, the passivation layer having at least one opening formed in the pixel area and exposing a portion of the first pixel electrode therein, and (i) forming a second pixel electrode and an auxiliary common electrode on the passivation layer in each pixel area, where the second pixel electrode is connected to a corresponding first pixel electrode and distantly surrounded by the auxiliary common electrode.

The method further includes the steps of positioning a second substrate apart from the first substrate, forming a liquid crystal layer between the first substrate and the second substrate, and forming a common electrode formed between the second substrate and the liquid crystal layer.

In one embodiment, the semiconductor layer includes amorphous silicon or poly silicon. The contact layer comprises doped amorphous silicon or doped poly silicon, where the doped amorphous silicon comprises $n^+$ doped a-Si or $p^+$ doped a-Si, and the doped poly silicon comprises $n^+$ doped p-Si or $p^+$ doped p-Si The first pixel electrode comprises IZO, amorphous ITO, poly ITO, or any combination of them. The first pixel electrode has a thickness in the range of about 0.04-3.0 μm. Each of the second pixel and auxiliary common electrodes includes transparent or opaque conductivity material.

In one embodiment, the passivation layer has at least one opening formed in each pixel area and exposing a portion of the first pixel electrode therein, such that the second pixel electrode is connected to the first pixel electrode through the at least one opening. The passivation layer in each pixel also has a patterned structure, where the patterned structure comprises a geometric shape of a circle, rectangle, polygon, star, or cross. In one embodiment, the patterned structure of the passivation layer in each pixel area is formed with an etching process. The passivation layer comprises SiNx, SiOx, SiON or insulating organic material and has a thickness in the range of about 0.1-10.0 μm.

In a further aspect, the present invention relates to a method of manufacturing an LCD device. In one embodiment, the method includes the steps of providing a first substrate and a second substrate positioned apart from the first substrate, forming a plurality of switch members on the first substrate, each pair of adjacent switch members defining a pixel area therebetween, forming a first pixel electrode on the first substrate in each pixel area, the first pixel electrode being connected to a corresponding switch member, forming an passivated insulation layer on the plurality of switch members and the first pixel electrode in each pixel area to protect the switch members and the first pixel electrode, forming a second pixel electrode and an auxiliary common electrode on the passivated insulation layer in each pixel area, where the second pixel electrode is connected to the first pixel electrode and distantly surrounded by the auxiliary common electrode, and forming a liquid crystal layer between the first substrate and the second substrate.

In one embodiment, the passivated insulation layer has a patterned structure in each pixel area. The patterned structure comprises a geometric shape of a circle, rectangle, polygon, star, or cross. The passivated insulation layer has at least one opening formed in each pixel area and exposing a portion of the first pixel electrode therein. In one embodiment, the second pixel electrode is connected to the first pixel electrode through the at least one opening.

In one embodiment, the switch member comprises a TFT having a gate electrode formed on the substrate and a source electrode connected to a data line and a drain electrode connected to the first pixel electrode, respectively.

The first pixel electrode comprises IZO, amorphous ITO, poly ITO, or any combination of them. The second pixel and auxiliary common electrodes comprise a conductive material.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
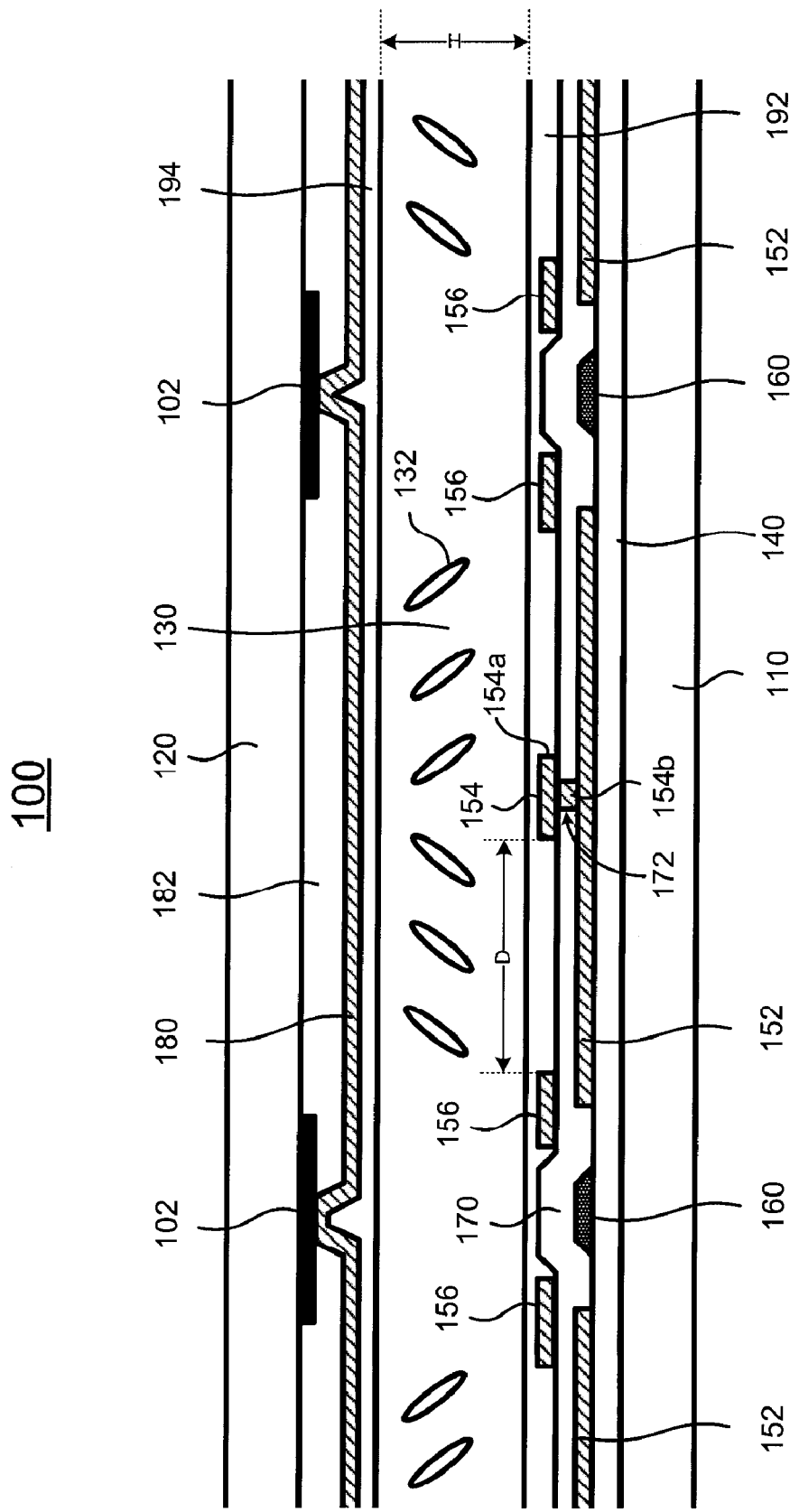
FIG. 1 shows schematically a cross-sectional view of an LCD device according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-8. In accordance with the purposes of this invention, as embodied and broadly described herein, this invention, in one aspect, relates to an LCD device that utilizes a passivation patterned structure to improve the viewing angle, light transmittance, contrast ratio and response time of display.

Referring to FIG. 1, an LCD device 100 is schematically shown according to one embodiment of the present invention. In this exemplary embodiment, the LCD device 100 includes a first substrate 110, a gate insulating film (a first dielectric layer) 140, a passivation layer (a second dielectric layer) 170, a first vertical alignment layer 192, a plurality of first pixel electrodes 152, a plurality of second pixel electrodes 154, a plurality of auxiliary common electrodes 156, a plurality of scanning lines and a plurality of data lines 160.

The gate insulating film 140 is formed of a dielectric material on the first substrate 110. The plurality of scanning lines (not shown) and the plurality of data lines 160 are formed such that they are insulated by the gate insulating film 140. The plurality of scanning lines is arranged in a first direction and a plurality of data lines 160 is arranged crossing the plurality of scanning lines in a second direction on the first substrate 110 to define a plurality of pixels therewith. In one embodiment, the plurality of pixels is arranged in a matrix. The first direction corresponds to the row direction of the pixel matrix, while the second direction corresponds to the column direction of the pixel matrix.

Each pixel includes a first pixel electrode 152, a second pixel electrode 154 and an auxiliary common electrode 156. The first pixel electrode 152 is formed on the gate insulating film 140 and spatially separated from its neighboring data lines 160 and scanning lines. The passivation layer 170 is formed to cover the plurality of the first pixel electrodes 152, the plurality of data lines 160 and the remaining portion of the gate insulating film 140. The passivation layer 170 has a patterned structure formed an opening 172 in each pixel area. The opening 172 is formed to expose the central portion of the first pixel electrode 152. The patterned structure has a geometric shape of a circle, rectangle, polygon, star, or cross. In each pixel, the second pixel electrode 154 is formed on the passivation layer 170 around an area in which the opening is located. As shown in FIG. 1, the second pixel electrode 154 has the flange portion 154a formed on the passivation layer 170 and a connection portion 154b extending from the flange portion 154a to the first pixel electrode 152 through the opening 172. The flange portion 154b of the second pixel electrode 154 may have a geometric shape of a circle, rectangle, or polygon. Additionally, an auxiliary common electrode 156 is formed on the passivation layer 170 and distantly surrounds the second pixel electrode 154 in each pixel area. The auxiliary common electrode 156 and the second pixel electrode 154 define a distance, D, therebetween.

The first vertical alignment layer 192 is formed on the second pixel electrode 154, the auxiliary common electrode 156 and the remaining portion of the passivation layer 170.

In one embodiment, the first pixel electrode 152 is formed of IZO, amorphous ITO, poly ITO, or any combination of them, and has a thickness in the range of about 0.04-3.0 µm. The second pixel electrode 154 and the auxiliary common electrode 156 are formed of transparent or opaque conductivity material. The gate insulating film 140 is formed of an insulating material such as SiNx, SiOx or SiON, or the like. The passivation layer 170 is formed of SiNx, SiOx, SiON or organic insulating material such as polyimide, and has a thickness in the range of about 0.1-10.0 µm.

Additionally, the LCD device 100 also includes a second substrate 120, a liquid crystal layer 130, a common electrode 180, a color filter 182, a second vertical alignment layer 194.

As shown in FIG. 1, the second substrate 120 is positioned to face the first substrate 110. The color filter 182 is formed on the second substrate 120. The common electrode 180 is in turn formed on the color filter 182. And the second vertical alignment layer 194 is then formed on the common electrode 180. The liquid crystal layer 130 is formed between the first vertical alignment layer 192 the second vertical alignment layer 194. The liquid crystal layer 130 has a thickness, H, that is corresponding to a cell gap between the first vertical alignment layer 192 and the second vertical alignment layer 194.

The liquid crystal layer 130 is filled with liquid crystal molecules 132. In one embodiment, the liquid crystals include a liquid crystal material having a negative dielectric anisotropy, such as twisted nematic (TN) liquid crystals, for example. The liquid crystals are selected such that a product of the refractive index $\delta_n$ of the liquid crystals and the cell gap H is in a range of about 0.15-0.60 um. The liquid crystals in the liquid crystal layer 130 are aligned homeotropically to the first substrate 110 and the second substrate 120 in the absence of an electric field therein, which is corresponding to a black display in the LCD device 100.

The first vertical alignment layer 192 and the second vertical alignment layer 194 are aligned such that when no voltage is applied to one or more of the first (second) pixel electrode 152 (154), the auxiliary common electrode 156, and the common electrode 180, the liquid crystal molecules are aligned to allow no light transmitting through the second vertical alignment layer 194, and when a voltage is applied, the liquid crystal molecules are aligned to allow light entering into the first vertical alignment layer 192 to transmit through the second vertical alignment layer 194. In one embodiment, each of the first and second vertical alignment layers may have a pre-tilt angle of about 80 degrees.

Additionally, the second substrate 120 may, for example, include a black matrix layer 102 for preventing light leakage in regions outside the pixel regions of the first substrate 110. A polarizer and an analyzer may also be arranged on the outer surfaces of the first and second substrates 110 and 120, respectively. A polarizing axis of the polarizer and an absorbing axis of the analyzer are preferably orthogonal to each other.

According to the present invention, no layer having protrusion structures formed on the common electrode is necessary. For such a configuration of the LCD device 100, when a voltage is applied to one of the first (second) pixel electrode 152 (154), the auxiliary common electrode 156, and the common electrode 180 to establish a voltage difference between the first (second) pixel electrode 152 (154), and the (auxiliary) common electrode 156, an oblique electric field is generated in the liquid crystal layer. The generated oblique electric field drives the liquid crystals of the liquid crystal layer in desired directions with no presence of a layer having protrusion structures formed on the common electrode. In this embodiment, the common electrode and the auxiliary common electrode have an identical, first electric potential, and the first pixel electrode and the second pixel electrode have an identical, second electric potential that is substantially different from the first electric potential.

Figure 2:
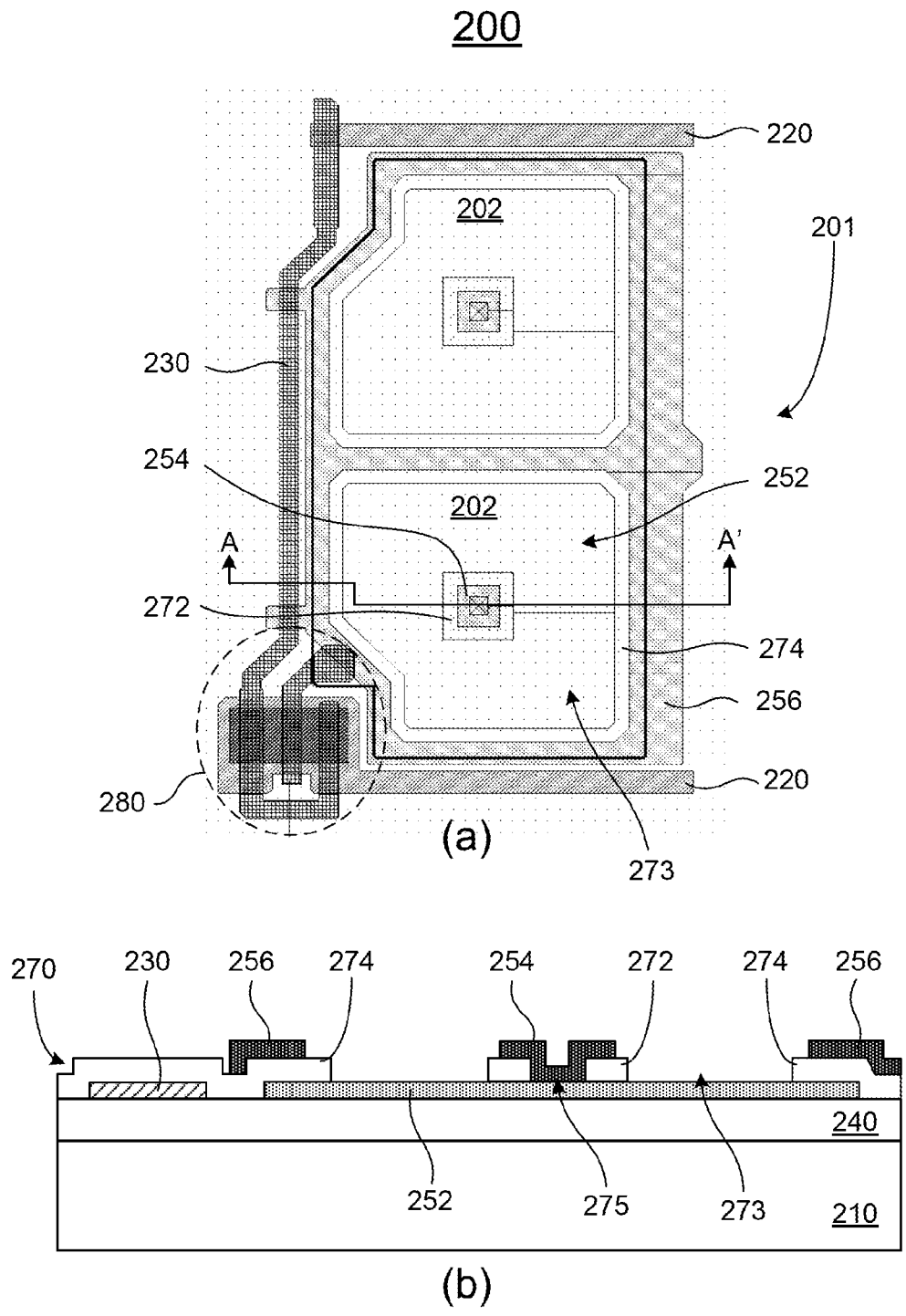
FIG. 2 shows schematically (a) a plane view of an LCD device and (b) a cross-sectional view of the LCD device along line A-A' according to one embodiment of the present invention.

Referring to FIG. 2, an LCD device 200 according to one embodiment of the present invention is schematically shown, where figure (a) is a plane view of a unit pixel of the LCD device 200 and figure (b) is a cross-sectional view of the LCD device 200 along line A-A'.

The LCD device 200 includes a substrate 210, a gate insulating film 240 formed on the substrate 210, and a plurality of scanning (gate) lines and data lines 220 and 230, respectively, formed to cross each other and insulated by the gate insulating film 240, and defining a plurality of pixel regions 201 where they cross. In this exemplary embodiment shown in FIG. 2, the pixel region 201 includes two sub-pixel regions 202. The LCD device 200 further includes a plurality of first pixel electrodes 252. Each pixel electrode 252 is formed within a corresponding sub-pixel region 202 on the gate insulating film 240.

A passivation layer 270 is formed on the plurality of first pixel electrodes 252, the plurality of scanning lines and data lines 220 and 230, and the remaining portion of the gate insulating film 240. As shown in FIG. 2, the passivation layer 270 is patterned to have a first opening 273 and a patterned structure 272 with a second opening 275 and an edge portion 274 surrounding the patterned structure 272 in each sub-pixel region 202. The first opening 273 is formed surrounding the pattern structure 272 and exposing a portion of the first pixel electrode 252. The second opening 275 is formed such that a portion of the first pixel electrodes 252 is exposed. The patterned structure 272 and the surrounding edge portion 274 are spatially separated from each other by the first opening 273.

In this embodiment, the patterned structure 272 has a shape of square positioned in the central area of each sub-pixel region 202. The passivation patterned structure 272 is adapted for inducing oblique electric fields therefore oblique equal potential lines in the liquid crystal layer. Such oblique equal potential lines can cause the liquid crystals of the liquid crystal layer to move to desired directions, thereby reducing the liquid crystal propagation time. As a result, the fast response time of the liquid crystals can be achieved.

Furthermore, the LCD device 200 include a second pixel electrode 254 formed on the patterned structure 272 of the passivation layer 270 in each sub-pixel region 202, and an auxiliary common electrode 256 formed on the surrounding edge portion of the passivation layer 270 in each sub-pixel region 202. The second pixel electrode 254 is formed to electrically connect to the first pixel electrode 252 through the opening 275. The auxiliary common electrode 256 is spatially apart from and surrounds the second pixel electrode 254.

A TFT 280 used as a switching element, is formed on a crossing point of a gate line 220 and a source line 230. For example, the TFT 280 includes a gate electrode extending from the gate line 220, a gate insulating film 240 formed on the gate electrode, a channel layer (not shown) formed on the gate insulating film 240 above the gate electrode, a source electrode extending from the source line 230 and overlapped with one side of the channel layer by a selected portion, and a drain electrode overlapped with the other side of the channel layer by a selected portion and connected to the first pixel electrode 252 and the second pixel electrode 254. The TFT 280 is capable of transmitting signals applied to the data line 230 to the first (second) pixel electrode 252 (254) in response to a signal applied to the gate line 220.

Figure 3:
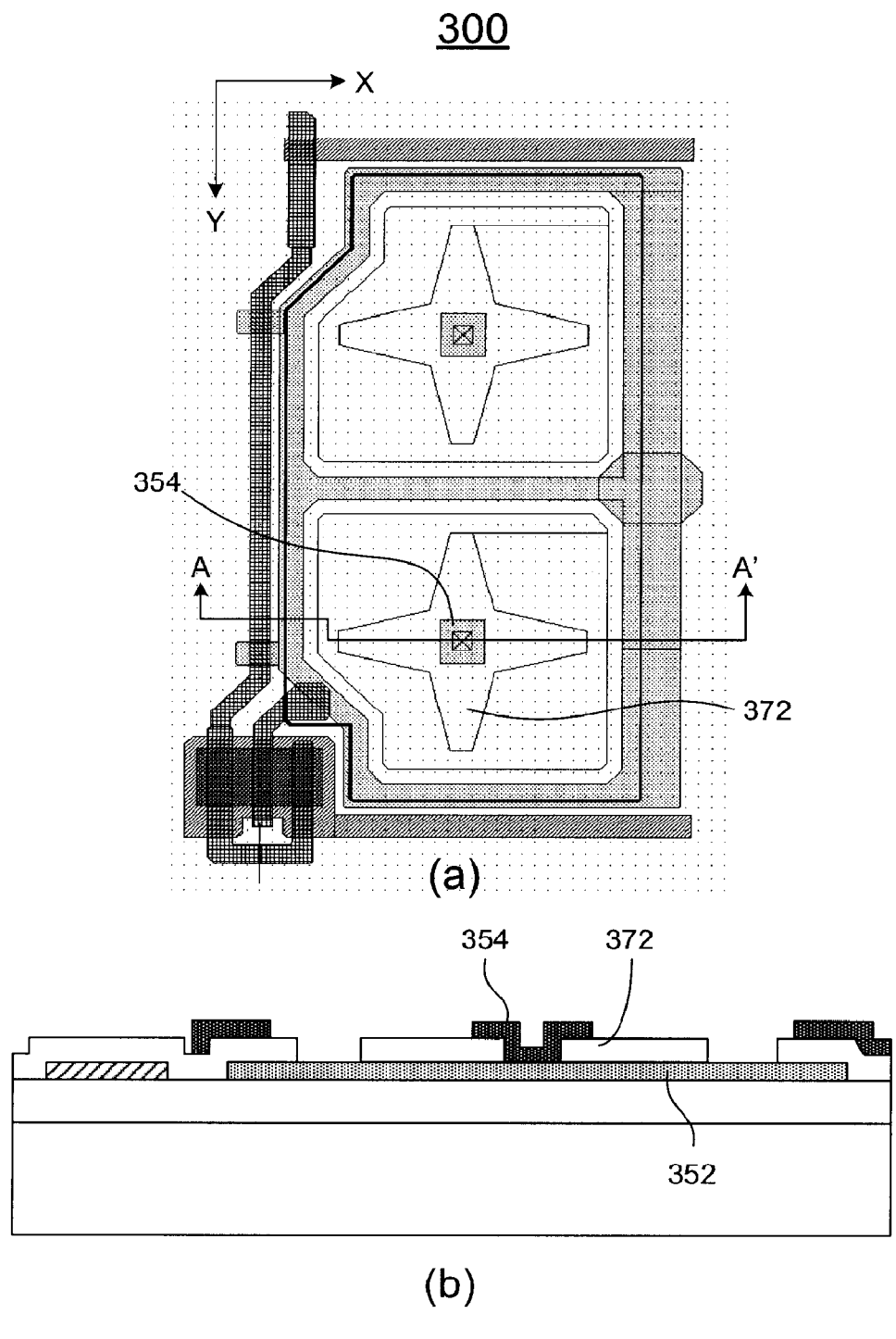
FIG. 3 shows schematically (a) a plane view of an LCD device and (b) a cross-sectional view of the LCD device along line A-A' according to another embodiment of the present invention.
Figure 4:
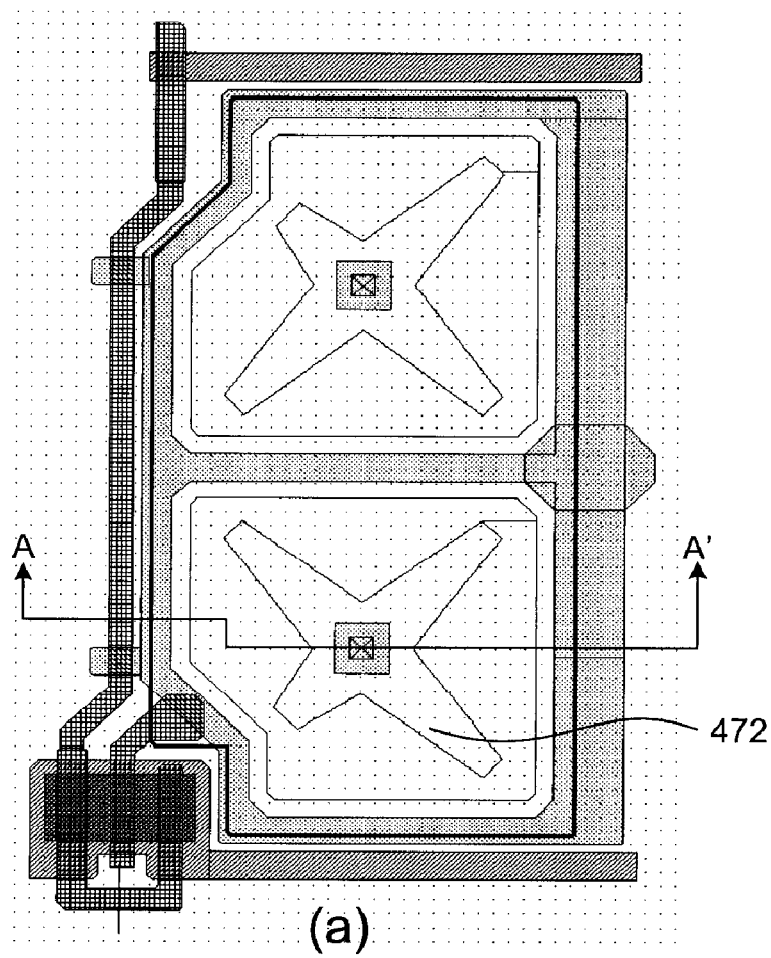
FIG. 4 shows schematically (a) a plane view of an LCD device and (b) a cross-sectional view of the LCD device along line A-A' according to an alternative embodiment of the present invention.
Figure 4:
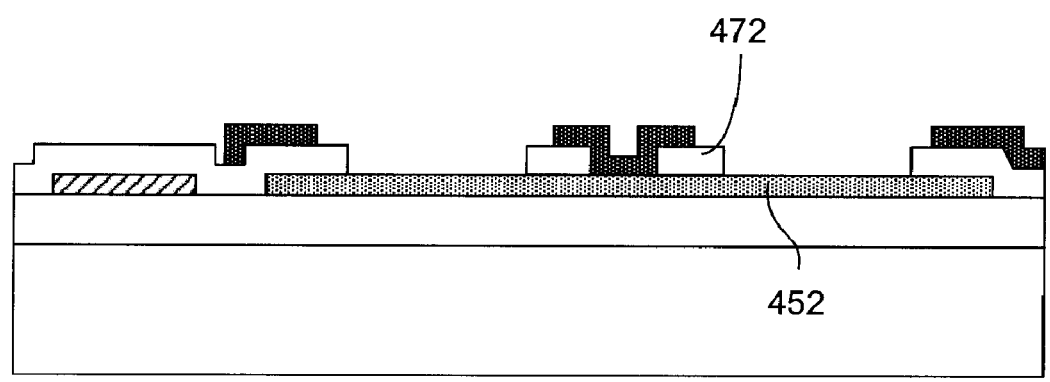
Figure 5:
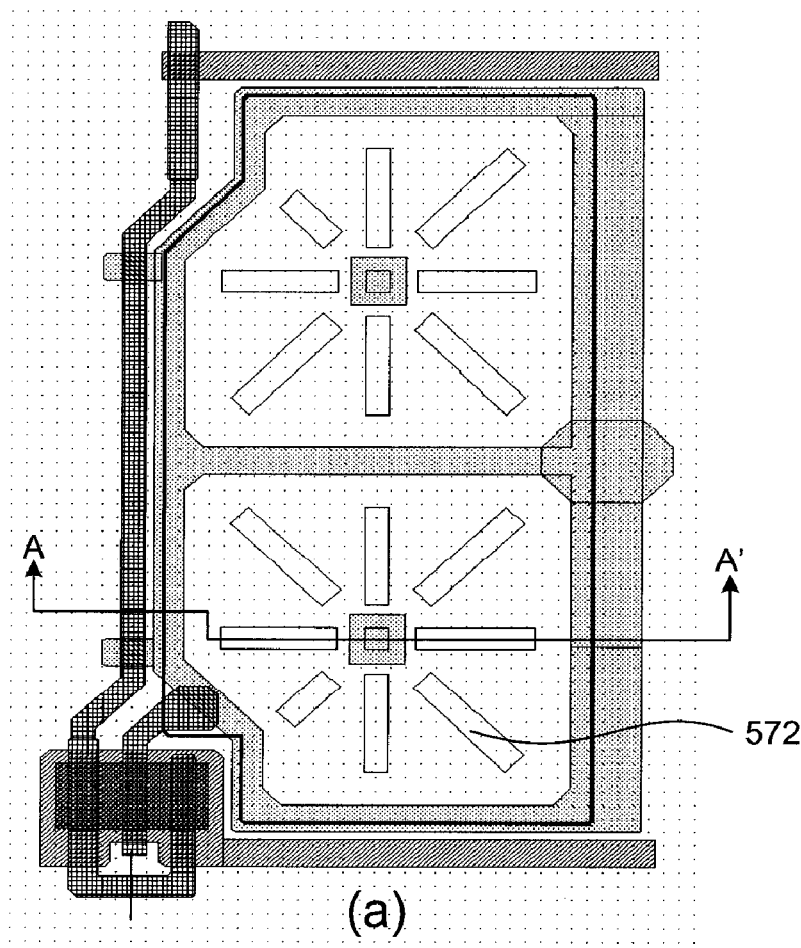
FIG. 5 shows schematically (a) a plane view of an LCD device and (b) a cross-sectional view of the LCD device along line A-A' according to one embodiment of the present invention.
Figure 5:
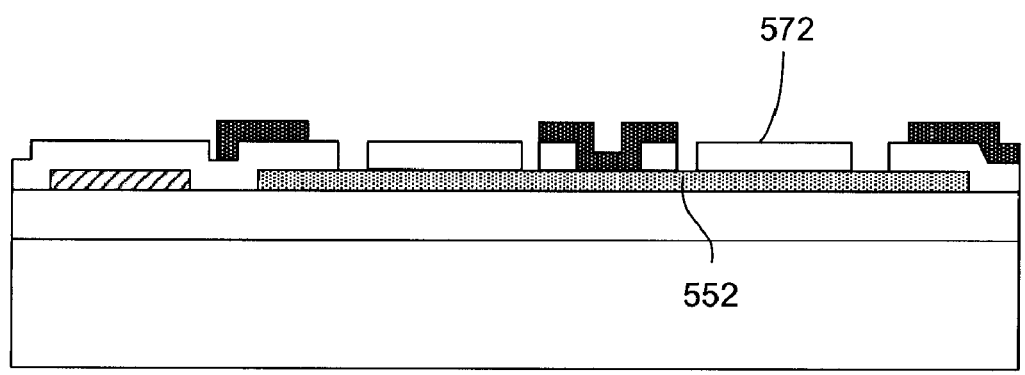

FIGS. 3-5 shows various embodiments of the LCD device 300, 400 or 500 according to the present invention. Each embodiment of the LCD device includes a unique shape of a passivation patterned structure. For example, in the embodiment shown in FIG. 3, the LCD device 300 has a passivation patterned structure 372 with a cross-like shape formed on a first pixel electrode 352. A second pixel electrode 354 is formed on the passivation patterned structure 372 and connected to the first pixel electrode 352. For such an arrangement, the passivation patterned structure 372 can result in oblique equal potential lines along the row (X) and the column (Y) directions. The oblique equal potential lines can cause the liquid crystals to move to desired directions along the X and Y directions.

In the embodiment shown in FIG. 4, the LCD device 400 has a passivation patterned structure 472 with an X-like shape formed on a first pixel electrode 452. Such a passivation patterned structure 472 may induce oblique equal potential lines along two diagonal directions of a sub-pixel region.

FIG. 5 shows a star-like shape of a passivation patterned structure 572 formed on a first pixel electrode 552, which may cause oblique equal potential lines to be formed along the X and Y directions and the diagonal directions.

It is apparent to those skilled in the art that other shapes of the passivation patterned structures can also utilized to practice the present invention.

Figure 6:
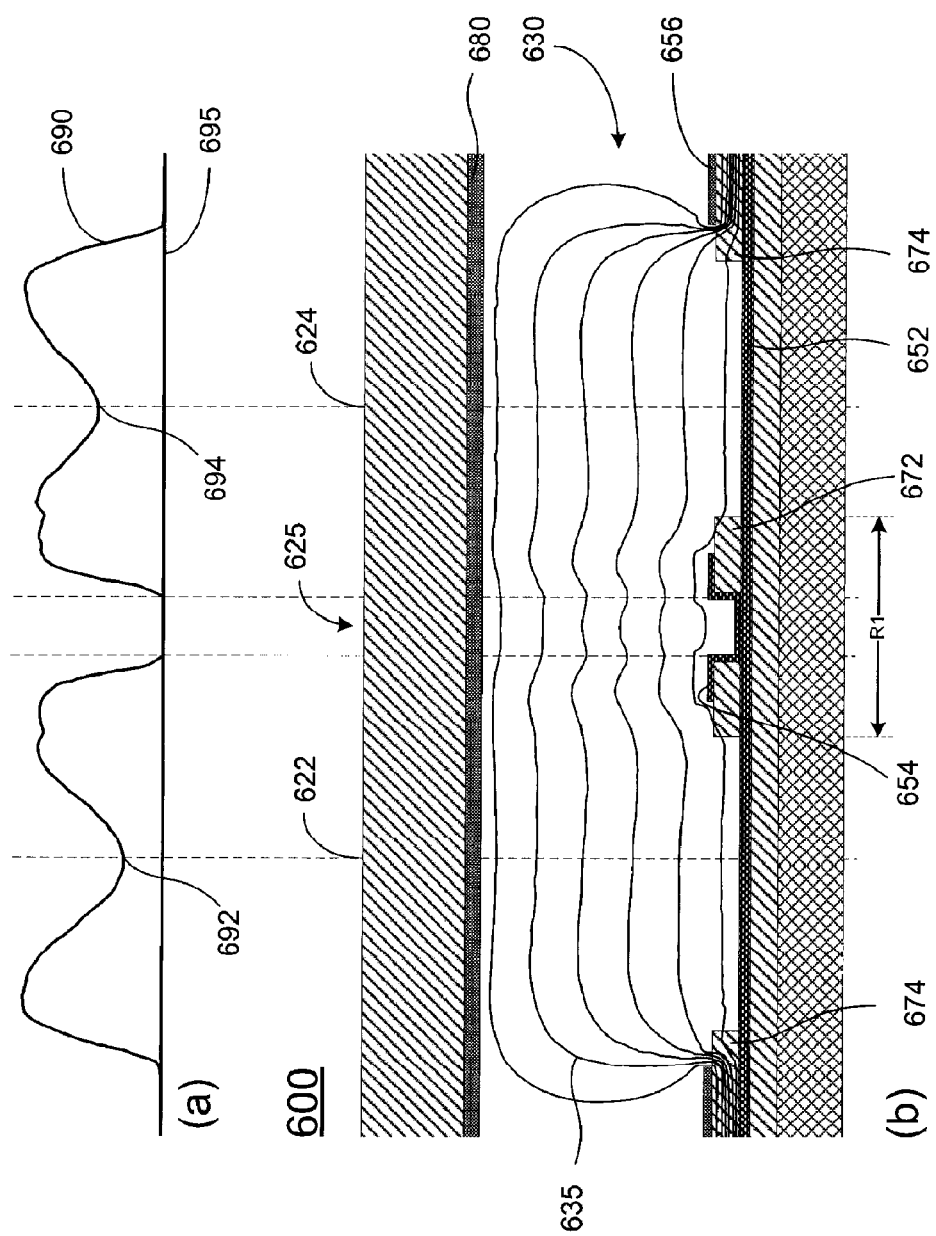
FIG. 6 shows schematically (a) a light transmittance curve of an LCD device, and (b) a cross-sectional view of the LCD device showing an oblique electric field generated in the liquid crystal layer according to one embodiment of the present invention.

FIG. 6 shows a light transmittance curve 690 and a cross-sectional view of an LCD device 600 showing oblique equal potential lines 635 formed in the liquid crystal layer 630 according to one embodiment of the present invention. The LCD device 600 has a first pixel electrode 652 and a second pixel electrode 654 spatially separated by a passivation patterned structure 672, and an auxiliary common electrode 656 formed on the same layer as the second pixel electrode 654. The passivation patterned structure 672 has an opening formed such that the second pixel electrode 654 is electrically connected to the first pixel electrode 652 through the opening. Additionally, the passivation patterned structure 672 is characterized with a specific geometric shape and a size, R1. The LCD device 600 has no protrusion layer formed on the common electrode (or color filter) 680. For such a LCD device 600, in operation, the auxiliary common electrode 656 and the common electrode 680 may have an identical, first electric potential, while the first pixel electrode 652 and the second pixel electrode 654 have an identical, second electrical potential that is substantially different from the first electric potential. The passivation patterned structure 672 between the first pixel electrode 652 and the second pixel electrode 654 induces an oblique electric field in the center area of a pixel in which the passivation patterned structure 672 is formed, while a voltage difference between the common electrode 680 and the first pixel electrode 652 induces an oblique electric field in the remaining area (surround area) of the pixel. Accordingly, the liquid crystals can be oriented to desired directions due to the induced oblique electric field in the liquid crystal layer 630. The induced oblique electric field is shown in terms of oblique equal potential lines 635 in FIG. 6b. The corresponding light transmittance curve 690 of the LCD device 600 is shown in FIG. 6(a). In this embodiment, no light transmittance is obtained in the central area 625 of a pixel, while light transmittance is obtained in the remaining area of the pixel. Furthermore, the light transmittance curve 690 has minima 692 and 694 at positions 622 and 624, respectively. Additionally, a light transmittance curve 695 in FIG. 6(a) is corresponding to the light transmittance of the LCD device 600 in the black display (state), where no voltage is applied. Therefore, no light is transmitted through the LCD device 600.

Figure 7:
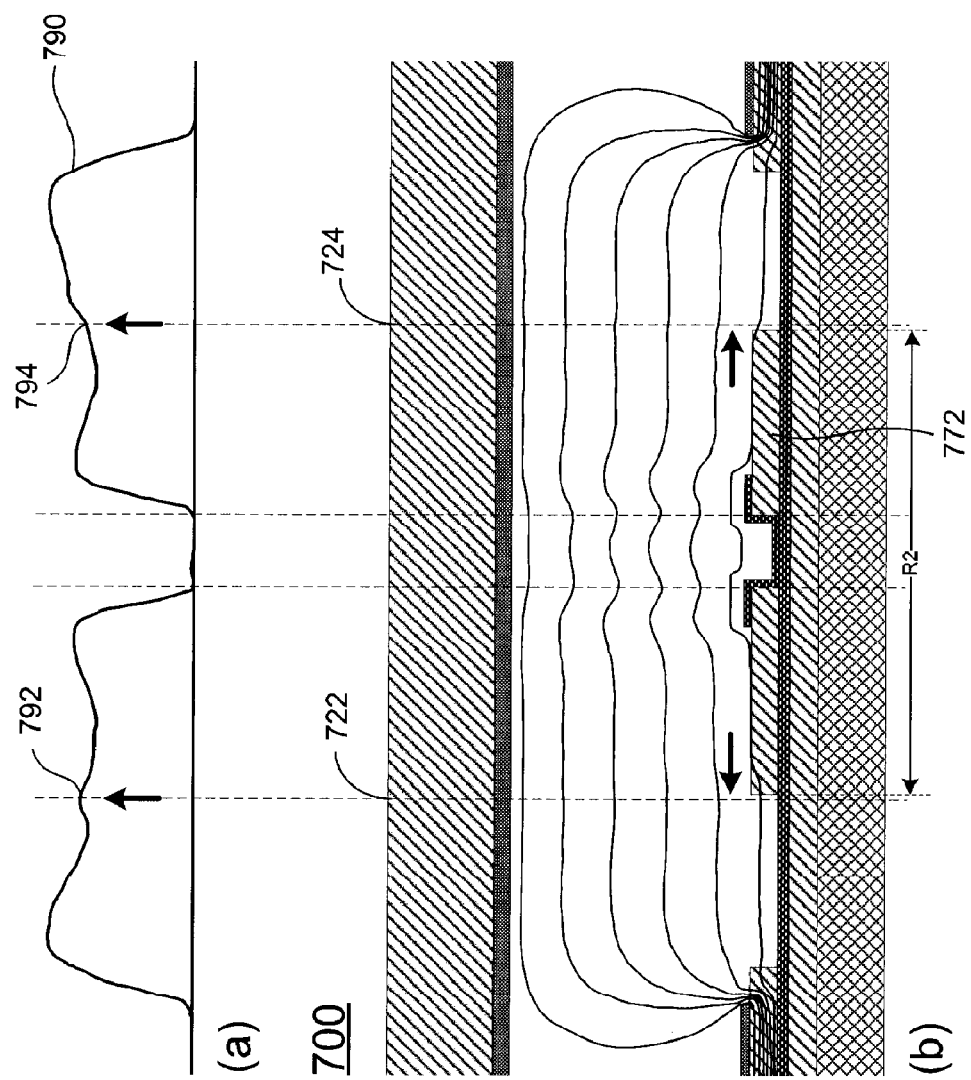
FIG. 7 shows schematically (a) a light transmittance curve of an LCD device, and (b) a cross-sectional view of the LCD device showing an oblique electric field generated in the liquid crystal layer according to another embodiment of the present invention.

FIG. 7 shows a light transmittance curve 790 and a cross-sectional view of an LCD device 700 showing oblique equal potential lines 735 formed in the liquid crystal layer 730 according to another embodiment of the present invention. The LCD device 700 has the same arrangement as that of the LCD device 600 shown in FIG. 6, except a size, R2, of the passivation patterned structure 772 is greater than the size R1 of the passivation patterned structure 672 of the LCD device 600. As a result, the light transmittance 792 (794) at position 722 (724) increase significantly, compared to its minima 692 (694) of the light transmittance in the LCD device 600 shown in FIG. 6.

Figure 8:
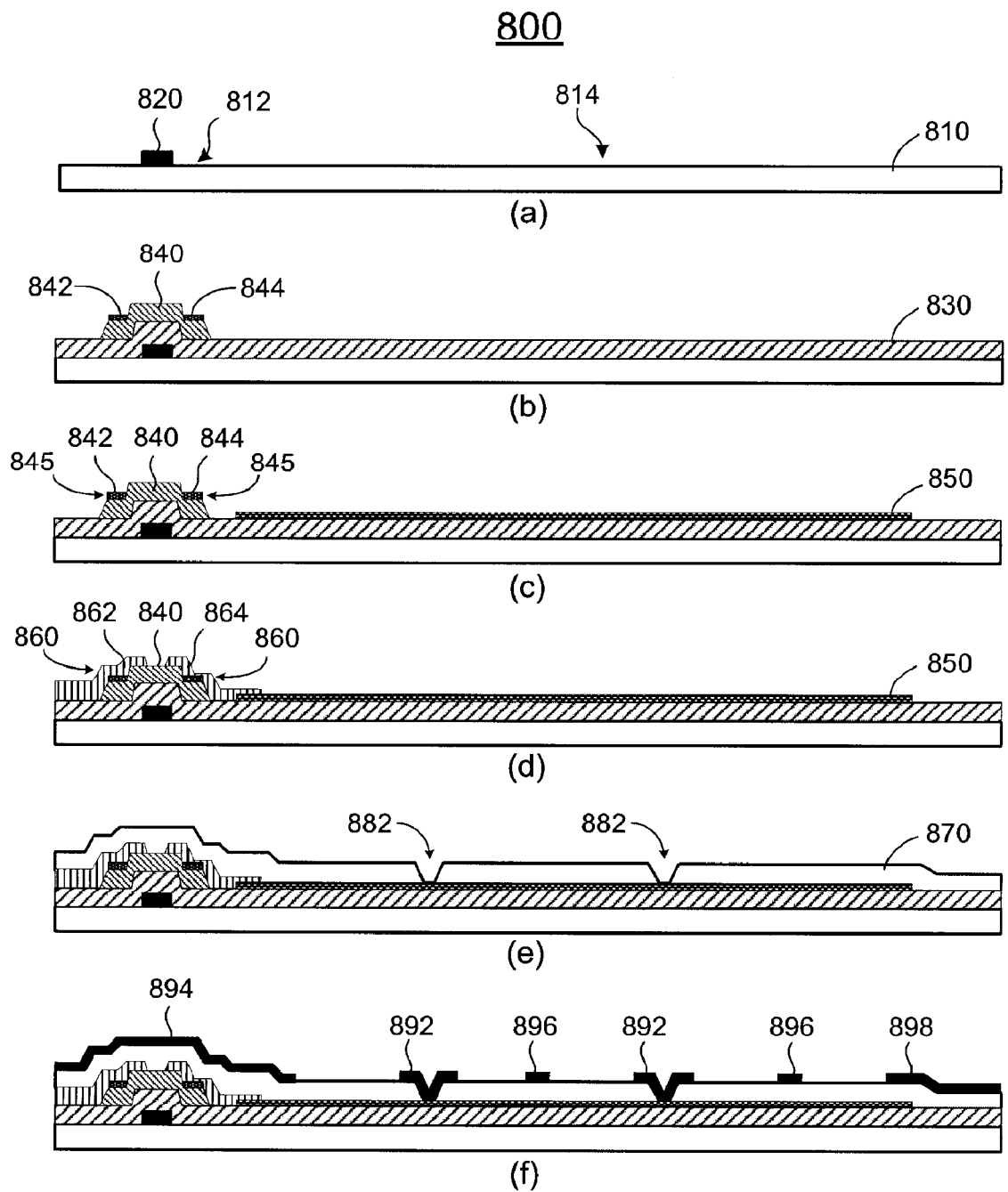
FIG. 8 shows schematically steps (a)-(f) of manufacturing an LCD device according to one embodiment of the present invention.
Figure 9:
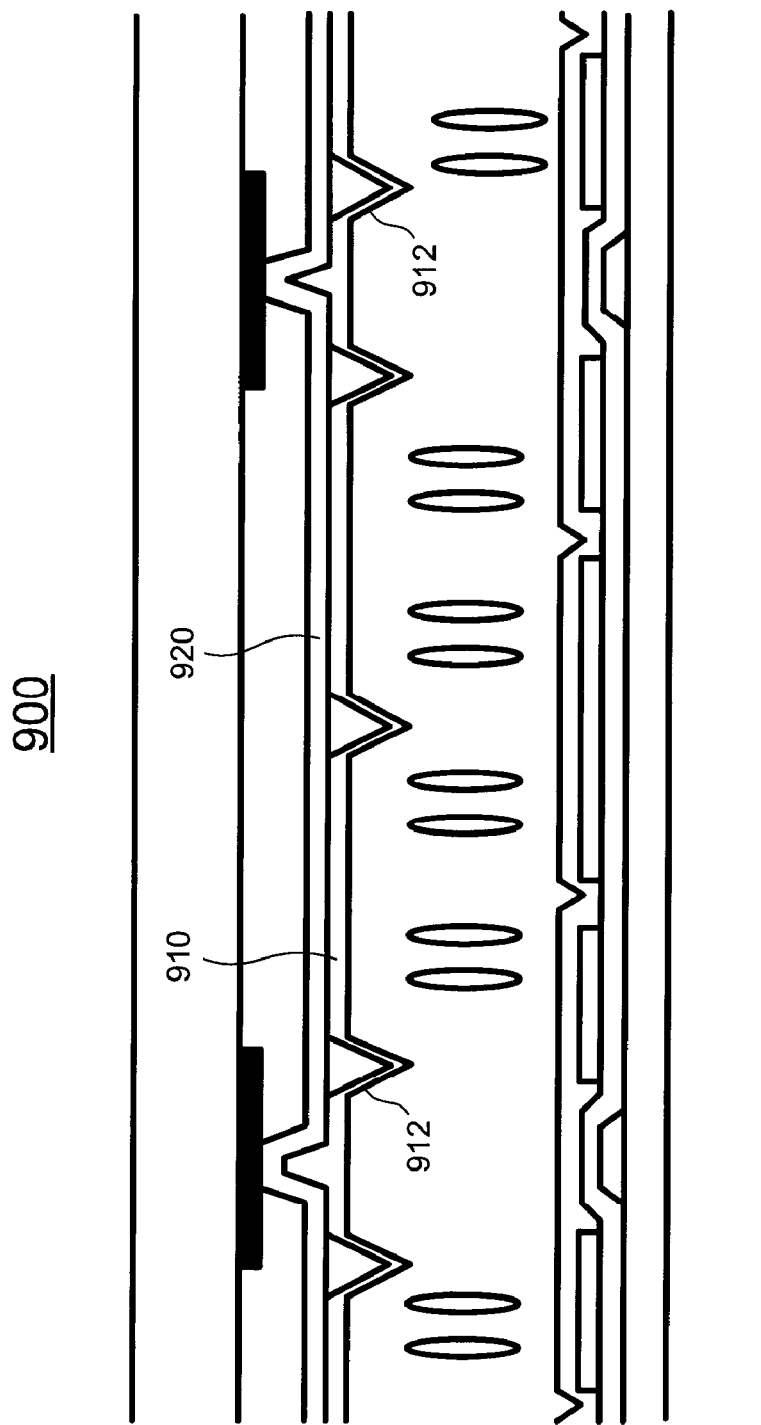
FIG. 9 shows schematically a cross-sectional view of a conventional LCD device.

Referring now to FIG. 8, a method of fabricating the invented LCD device is schematically shown according to one embodiment of the present invention. The method includes the following steps. At first, a first substrate 810 is provided. The first substrate 810 is formed of glass, or the likes. Then, a plurality of gate electrodes 820 electrically coupled to a gate line is formed spatially apart from one another on the first substrate 810. Each pair of adjacent gate electrodes 820 defining a pixel area 814 therebetween, where the pixel area 814 is adjacent to a switching area 812 in which a corresponding gate electrode 820 is formed. The gate electrode 820 is formed of a metal such as Al, Mo, Cr, Ta, or alloy.

A dielectric layer (gate insulating film) 830 is formed on the first substrate 810 and the plurality of gate electrodes 820. The gate insulating film 830 is formed of SiNx, SiOx, or SiON. In one embodiment, the gate insulating film 830 is formed in such a manner that SiNx or SiOx is deposited on the first substrate 810 and the plurality of gate electrodes 820 by plasma enhancement chemical vapor deposition (PECVD).

A semiconductor layer 840 is then formed on the gate insulating film 830 in each switching area 812. Subsequently, a contact layer 845 is formed on the semiconductor layer 840 and patterned to have a first contact portion 842 and a second contact portion 844 separated from the first contact portion 842. The semiconductor layer 840 comprises an amorphous silicon or a poly silicon, or the likes. The contact layer 845 is formed of a doped amorphous silicon such as $n^+$ doped a-Si or $p^+$ doped a-Si. In one embodiment, the semiconductor layer 840 and the contact layer 845 are formed in such a manner that the amorphous silicon (a-Si) and the doped amorphous silicon ($n^+$ doped a-Si or $p^+$ doped a-Si) are successively deposited by PECVD and then patterned.

Alternatively, the gate insulating film 830 of SiNx or SiOx, the amorphous silicon layer 840, and the doped amorphous silicon layer 845 may sequentially be deposited, and the amorphous silicon layer 840 and the doped amorphous silicon layer 845 may be patterned to form the semiconductor layer 840 and the contact layer 845.

Next, a conductive layer such as IZO, amorphous ITO, poly ITO, or any combination of them is deposited by sputtering and patterned on the gate insulating film 830 to form a pixel electrode 850 in each pixel area 814. The first pixel electrode 850 has a thickness in the range of about 0.04-3.0 μm. As shown in FIG. 8(c), the first pixel electrode 850 is spatially distanced from the semiconductor layer 840.

Afterwards, a metal layer 860 is formed on the semiconductor layer 840 and the contact layer 845 in each switching area 812. The metal layer 860 is patterned to have a first portion 862 that is connected to a data line and a second portion 864 that is separated from the first portion 862 and connected to the first pixel electrode layer 850 in a corresponding pixel area 814.

A passivation layer (film) 870 is then formed of a dielectric material such as SiNx or SiOx on the metal layer 860 in each switching area 812 and the first pixel electrode 850 in each pixel area 814. The passivation film 870 in each pixel area 814 has a patterned structure with at least one opening 882 formed in the pixel area 814 such that a portion of the first pixel electrode 850 is exposed. The patterned structure may have a geometric shape of a circle, rectangle, polygon, star, cross, or the like, as shown in FIGS. 2-5. In one embodiment, the patterned structure of the passivation layer 870 in each pixel area 814 is formed with an etching process and has a thickness in the range of about 0.1-10.0 μm.

The next step is to form a second pixel electrode 892 and an auxiliary common electrode 896 on the passivation layer 870 in each pixel area 814. The second pixel electrode 892 is connected to a corresponding first pixel electrode 850 through the at least one opening 822 and distantly surrounded by the auxiliary common electrode 896. The second pixel electrode 892 and the auxiliary common electrode 896 are formed of a transparent or opaque conductivity material.

Additionally, the method further comprising the steps of providing a second substrate facing the first substrate; forming a liquid crystal layer between the first substrate and the second substrate; and forming a common electrode formed between the second substrate and the liquid crystal layer, with no presence of protrusion structures facing the liquid crystal layer. The liquid crystals are injected into the liquid crystal layer. The liquid crystals have a negative dielectric anisotropy.

The present invention, among other things, discloses an LCD device having a first pixel electrode and a second pixel electrode spatially separated by a passivation patterned structure, and an auxiliary common electrode formed on the same layer as the second pixel electrode. The passivation patterned structure has an opening formed such that the second pixel electrode is electrically connected to the first pixel electrode through the opening. For such a LCD device, in operation, the auxiliary common electrode and the common electrode have an identical, first electric potential, while the first pixel electrode and the second pixel electrode have an identical, second electrical potential that is substantially different from the first electric potential. Accordingly, the LCD device is operable with a wide viewing angle, higher transmittance, high contrast and fast response time of display.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD) device, comprising:
   a first substrate and a second substrate positioned apart to define a cell gap therebetween;
   a liquid crystal layer positioned in the cell gap between the first substrate and the second substrate;
   a common electrode formed between the second substrate and the liquid crystal layer; and
   a plurality of scanning lines arranged in a first direction on the first substrate and a plurality of data lines arranged crossing the plurality of scanning lines in a second direction that is substantially perpendicular to the first direction on the first substrate to define a plurality of pixels therewith, each pixel comprising:
   a first dielectric layer formed on the first substrate;
   a first pixel electrode formed on the first dielectric layer, the first pixel electrode defining a first electrode area;
   a second dielectric layer formed at least on the first pixel electrode, the second dielectric layer having a first opening and a patterned structure with a second opening, the first opening surrounding the patterned structure and exposing a portion of the first pixel electrode;
   a second pixel electrode formed on the pattern structure of the second dielectric layer, the second pixel electrode being electrically connected to the first pixel electrode through the second opening and positioned over the first pixel electrode, the second pixel electrode defining a second electrode area less than the first electrode area; and
   an auxiliary common electrode formed on the second dielectric layer, distantly surrounding the second pixel, wherein the common electrode and the auxiliary common electrode have a same electric potential.

2. The LCD device of claim 1, wherein the first pixel electrode is formed of indium zinc oxide (IZO), amorphous indium tin oxide (ITO), poly ITO, or any combination of them.

3. The LCD device of claim 2, wherein the first pixel electrode has a thickness in the range of about 0.04-3.0 μm.

4. The LCD device of claim 1, wherein the second pixel electrode has a geometric shape of a circle, rectangle, or polygon.

5. The LCD device of claim 1, wherein the second pixel electrode and the auxiliary common electrode define a distance therebetween, which is greater than the cell gap.

6. The LCD device of claim 1, wherein the second pixel electrode and the auxiliary common electrode are formed of transparent or opaque conductivity material.

7. The LCD device of claim 1, wherein the patterned structure comprises a geometric shape of a circle, rectangle, polygon, star, or cross.

8. The LCD device of claim 1, wherein the second dielectric layer is formed of SiNx, SiOx, SiON or insulating organic material.

9. The LCD device of claim 8, wherein the second dielectric layer has a thickness in the range of about 0.1-10.0 μm.

10. The LCD device of claim 1, wherein the liquid crystal layer comprises liquid crystals having a negative dielectric anisotropy.

11. The LCD device of claim 10, wherein the liquid crystals are selected such that a product of the refractive index $\delta_n$ of the liquid crystals and the cell gap is in a range of about 0.15-0.60 um.

12. The LCD device of claim 10, wherein the liquid crystals are aligned homeotropically to the first substrate and the second substrate in the absence of an electric field therein.

13. The LCD device of claim 1, wherein when a voltage is applied to one of the first pixel electrode and the common electrode, a corresponding voltage difference is established therebetween, and an oblique electric field is generated in the liquid crystal layer.

14. The LCD device of claim 13, wherein the generated oblique electric field drives the liquid crystals of the liquid crystal layer in desired directions.

15. The LCD device of claim 13, wherein the common electrode and the auxiliary common electrode have an identical, first electric potential, and the first pixel electrode and the second pixel electrode have an identical, second electric potential that is substantially different from the first electric potential.

16. A liquid crystal display (LCD) device, comprising:
   a first substrate and a second substrate positioned apart from the first substrate;
   a liquid crystal layer positioned between the first substrate and the second substrate;
   a common electrode formed between the second substrate and the liquid crystal layer; and
   a plurality of pixels formed on the first substrate, each pixel comprising:
   a first pixel electrode formed on the first substrate, the first pixel electrode defining a first electrode area;

a dielectric layer formed at least on the first pixel electrode, the dielectric layer having a first opening and a patterned structure with a second opening, first opening surrounding the patterned structure and exposing a portion of the first pixel electrode;

a second pixel electrode formed on the patterned structure of the dielectric layer, the second pixel electrode being electrically connected to the first pixel electrode through the second opening and positioned over the first pixel electrode, the second pixel electrode defining a second electrode area less than the first electrode area; and an auxiliary common electrode formed on the dielectric layer, distantly surrounding the second pixel electrode, wherein the common electrode and the auxiliary common electrode have a same electric potential.

17. The LCD device of claim 16, wherein the liquid crystal layer comprises a plurality of liquid crystals that are aligned homeotropically to the first substrate and the second substrate in the absence of an electric field therein.

18. The LCD device of claim 16, wherein in operation, the common electrode and the auxiliary common electrode have an identical, first electric potential, and the first pixel electrode and the second pixel electrode have an identical, second electric potential that is substantially different from the first electric potential.

19. The LCD device of claim 16, wherein the patterned structure comprises a geometric shape of a circle, rectangle, polygon, star, or cross.

20. A method of manufacturing a liquid crystal display (LCD) device, comprising the steps of:
providing a first substrate;
forming a plurality of gate electrodes on the first substrate, each pair of adjacent gate electrodes defining a pixel area therebetween, the pixel area being adjacent to a switching area in which a corresponding gate electrode is formed;
forming a dielectric layer on the first substrate and the plurality of gate electrodes;
forming a semiconductor layer on the dielectric layer in each switching area;
forming an contact layer on the semiconductor layer, the contact layer having a first portion and a second portion separated from the first portion;
forming a first pixel electrode on the dielectric layer in each pixel area, the first pixel electrode defining a first electrode area therein;
forming a metal layer on the contact layer in each switching area, the metal layer having a first portion connected to a data line and a second portion separated from the first portion and connected to the pixel electrode layer in a corresponding pixel area;
forming a passivation layer on the metal layer in each switching area and the first pixel electrode in each pixel area, the passivation layer having a first opening and a patterned structure with at least one second opening formed in the pixel area, the first opening surrounding the patterned structure and exposing a portion of the first pixel electrode therein; and
forming a second pixel electrode and an auxiliary common electrode on the passivation layer in each pixel area, the second pixel electrode distantly surrounded by the auxiliary common electrode, the second pixel electrode being formed on the patterned structure and electrically connected to a corresponding first pixel electrode through the second opening and positioned directly over the first pixel electrode, the second pixel electrode defining a second electrode area less than the first electrode area;

positioning a second substrate apart from the first substrate, the second substrate having a common electrode; and forming a liquid crystal layer between the first substrate and the second substrate, and the common electrode being positioned between the second substrate and the liquid crystal layer.

21. The method of claim 20, wherein the semiconductor layer comprises amorphous silicon or poly silicon.

22. The method of claim 20, wherein the contact layer comprises doped amorphous silicon or doped poly silicon.

23. The method of claim 22, wherein the doped amorphous silicon or doped poly silicon is doped poly silicon and comprises n$^+$ doped p-Si or p$^+$doped p-Si.

24. The method of claim 22, wherein the doped amorphous silicon or doped poly silicon is doped amorphous silicon comprises n$^+$doped a-Si or p$^+$doped a-Si.

25. The method of claim 19, wherein the first pixel electrode comprises indium zinc oxide (IZO), amorphous indium tin oxide (ITO), poly ITO, or any combination of them.

26. The method of claim 25, wherein the first pixel electrode has a thickness in the range of about 0.04-3.0 μm.

27. The method of claim 20, wherein the patterned structure comprises a geometric shape of a circle, rectangle, polygon, star, or cross.

28. The method of claim 20, wherein the patterned structure of the passivation layer in each pixel area is formed with an etching process.

29. The method of claim 20, wherein the passivation layer comprises SiNx, SiOx, SiON or insulating organic material and has a thickness in the range of about 0.1-10.0 μm.

30. The method of claim 20, wherein each of the second pixel electrode and auxiliary common electrode comprises transparent or opaque conductivity material.

31. A method of manufacturing a liquid crystal display (LCD) device, comprising the steps of:
providing a first substrate and a second substrate positioned apart from the first substrate, and the second substrate having a common electrode;
forming a plurality of switch members on the first substrate, each pair of adjacent switch members defining a pixel area therebetween;
forming a first pixel electrode on the first substrate in each pixel area, the first pixel electrode defining a first electrode area and being connected to a corresponding switch member;
forming an insulation layer passivating the plurality of switch members and the first pixel electrode in each pixel area, the insulation layer having a first opening and a patterned structure with at least one second opening formed in the pixel area, the first opening surrounding the patterned structure and exposing a portion of the first pixel electrode;
forming a second pixel electrode and an auxiliary common electrode on the insulation layer in each pixel area, the second pixel electrode distantly surrounded by the auxiliary common electrode, the second pixel electrode being formed on the patterned structure and electrically connected to the first pixel electrode through the second opening and positioned over the first pixel electrode, the second pixel electrode defining a second electrode area less than the first electrode area; and forming a liquid crystal layer between the first substrate and the second substrate and the common electrode being positioned between the second substrate and the liquid crystal layer.

32. The method of claim 31, wherein the patterned structure comprises a geometric shape of a circle, rectangle, polygon, star, or cross.

33. The method of claim 31, wherein the switch member comprises a thin film transistor (TFT) having a gate electrode formed on the substrate and a source electrode connected to a data line and a drain electrode connected to the first pixel electrode, respectively.

34. The method of claim 31, wherein the first pixel electrode comprises indium zinc oxide (IZO), amorphous indium tin oxide (ITO), poly ITO, or any combination of them.

35. The method of claim 31, wherein the second pixel electrode and auxiliary common electrode comprise a conductive material.

\* \* \* \* \*